(12) United States Patent
Takeda et al.

(10) Patent No.: US 11,463,225 B2
(45) Date of Patent: Oct. 4, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 77 days.

(21) Appl. No.: 16/496,255

(22) PCT Filed: Mar. 23, 2017

(86) PCT No.: PCT/JP2017/011890
§ 371 (c)(1),
(2) Date: Sep. 20, 2019

(87) PCT Pub. No.: WO2018/173233
PCT Pub. Date: Sep. 27, 2018

(65) Prior Publication Data
US 2021/0119756 A1 Apr. 22, 2021

(51) Int. Cl.
*H04L 5/00* (2006.01)
*H04L 27/26* (2006.01)
(Continued)

(52) U.S. Cl.
CPC .......... *H04L 5/0082* (2013.01); *H04L 5/0051* (2013.01); *H04L 27/261* (2013.01);
(Continued)

(58) Field of Classification Search
CPC ... H04L 5/0082; H04L 27/261; H04L 5/0051; H04W 72/0446; H04W 72/1268; H04W 80/02
See application file for complete search history.

(56) References Cited

U.S. PATENT DOCUMENTS

2018/0302900 A1* 10/2018 Ibars Casas ........ H04W 72/042
2018/0376495 A1* 12/2018 Lee ........................ H04W 48/12
(Continued)

OTHER PUBLICATIONS

Huawei, "Discussion on UL RS for short TTI", 3GPP TSG-RAN WG1#86 R1-166156, Aug. 12, 2016 (Year: 2016).*
(Continued)

*Primary Examiner* — Gary Mui
*Assistant Examiner* — Chuong M Nguyen
(74) *Attorney, Agent, or Firm* — Osha Bergman Watanabe & Burton LLP

(57) ABSTRACT

To control UL transmission properly even when uplink data and demodulation reference signals are transmitted using short TTIs, a user terminal according to one aspect of the present invention has a transmission section that transmits a UL signal and a reference signal for use for demodulating the UL signal, and a control section that controls the allocation of the UL signal and the reference signal, and, when UL signals are allocated to a plurality of contiguous predetermined time intervals (sTTIs), respectively, the control section allocates the UL signal and the reference signal for use for demodulating the UL signal to the same sTTI, at least in an sTTI apart from the top sTTI.

5 Claims, 11 Drawing Sheets

(51) Int. Cl.
*H04W 72/04* (2009.01)
*H04W 72/12* (2009.01)
*H04W 80/02* (2009.01)

(52) U.S. Cl.
CPC ... *H04W 72/0446* (2013.01); *H04W 72/1268* (2013.01); *H04W 80/02* (2013.01)

(56) References Cited

U.S. PATENT DOCUMENTS

2020/0052841 A1* 2/2020 Takeda .................. H04J 13/004
2021/0021454 A1* 1/2021 Horiuchi ........... H04W 28/0273

OTHER PUBLICATIONS

CATT "Design of sPUSCH for shortened TTI", 3GPP R1-162299, Apr. 2, 2016 (Year: 2018).*
Huawei "Discussion on UL RS for short TTI", 3GPP R1-166156, Aug. 22-26, 2016 (Year: 2016).*
CATT "Design of sPUSCH for shortened TTI", 3GPP R1-162299, Apr. 2, 2016 (Year: 2016).*
Huawei NPL "Discussion on UL RS for short TTI", 3GPP R1-166156, Aug. 22-26, 2016 (Year: 2016).*
International Search Report for corresponding International Application No. PCT/JP2017/011890, dated Jun. 6, 2017 (3 pages).
Written Opinion for corresponding International Application No. PCT/JP2017/011890, dated Jun. 6, 2017 (3 pages).
3GPP TS 136 300 V8.12.0; "Evolved Universal Terrestrial Radio Access (E-UTRA) and Evolved Universal Terrestrial Radio Access Network (E-UTRAN); Overall description; Stage 2 (Release 8)"; Mar. 2010; (149 pages).
H. Huawei; "Discussion on UL RS for short TTI"; 3GPP TSG RAN WG1 Meeting #86, R1-166156; Gothenburg, Sweden; Aug. 22-26, 2016 (4 pages).
Extended European Search Report issued in European Application No. 17901588.8, dated Oct. 19, 2020 (8 pages).
Li, J. et al.; "Uplink PHY Design with Shortened TTI for Latency Reduction;" IEEE Wireless Communications and Networking Conference (WCNC); Mar. 19, 2017; pp. 1-5 (5 pages).
3GPP TSG RAN WG1 Meeting #84bis; R1-162299; "Design of sPUSCH for shortened TTI;" CATT; Apr. 11-15, 2016; Busan, Korea (4 pages).
Office Action issued in the counterpart Japanese Patent Application No. 2019-506866, dated Jun. 1, 2021 (8 pages).
Office Action issued in Chinese Application No. 201780090757.6; dated Oct. 25, 2021 (10 pages).
J. Li et al. "Uplink PHY Design with Shortened TTI for Latency Reduction" IEEE Wireless Communications and Networking Conference; 2017 (6 pages).
Office Action issued in Japanese Application No. 2019-506866; dated Dec. 21, 2021 (8 pages).
3GPP TSG-RAN WG1 Meeting #88; R1-1703256 "On UL sTTI layout" Ericsson; Athens, Greece; Feb. 13-17, 2017 (8 pages).
Office Action issued in Chinese Application No. 201780090757.6; dated Mar. 29, 2022 (13 pages).

* cited by examiner

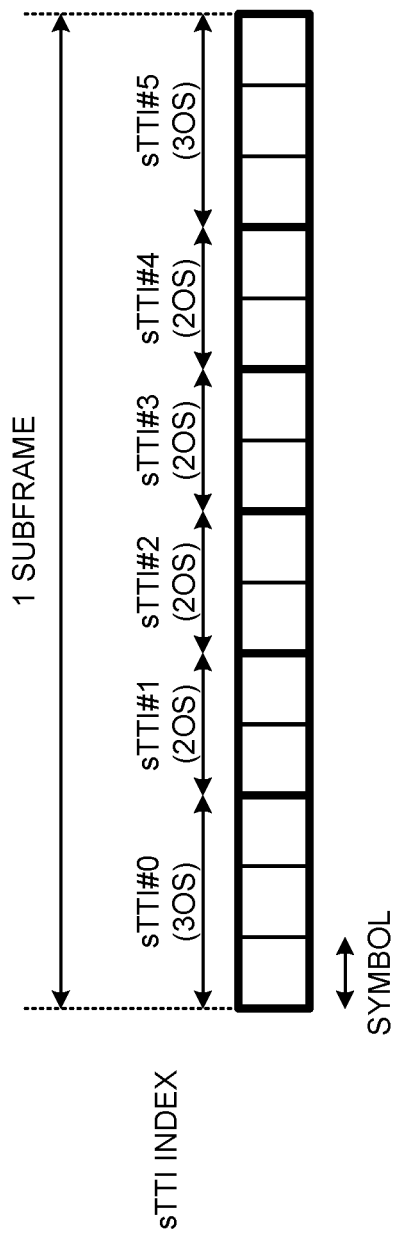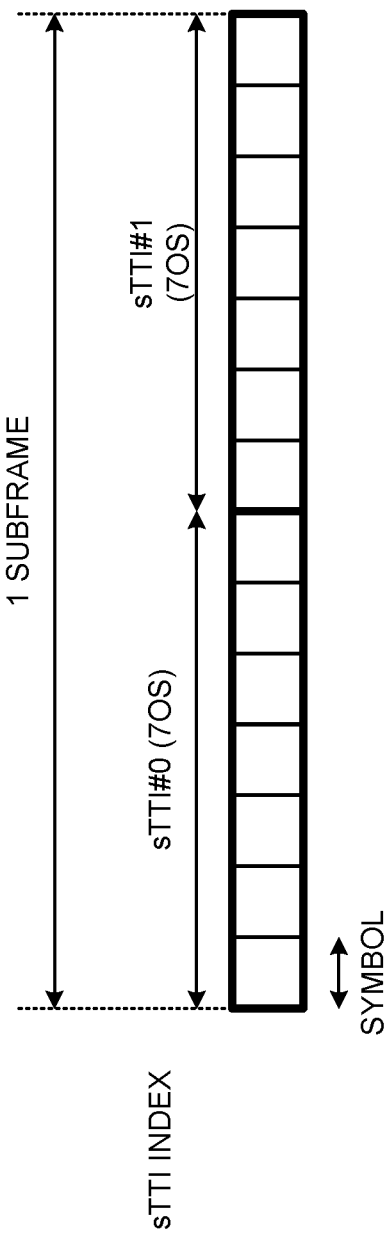
FIG. 1A
FIG. 1B

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and/or the like).

In existing LTE systems (for example, LTE Rel. 10 and later versions), carrier aggregation (CA) to integrate a number of carriers (component carriers (CCs), cells, and so forth) is introduced in order to achieve broadbandization. Each carrier is configured with the system bandwidth of LTE Rel. 8 as 1 unit. In addition, in CA, multiple CCs under the same radio base station (eNB (eNodeB)) are configured in a user terminal (UE (User Equipment)).

Meanwhile, in existing LTE systems (for example, LTE Rel. 12 and later versions), dual connectivity (DC), in which a number of cell groups (CGs) formed by different radio base stations are configured in a user terminal, is also introduced. Every cell group is comprised of at least 1 cell (CC, cell, etc.). In DC, since a number of CCs of different radio base stations are integrated, DC is also referred to as "inter-eNB CA."

In existing LTE systems (for example, in LTE Rel. 13 or earlier versions), downlink (DL) and/or uplink (UL) communication are carried out using 1-ms transmission time intervals (TTIs). This 1-ms TTI is the unit of time it takes to transmit 1 channel-encoded data packet, and is the processing unit in, for example, scheduling, link adaptation, retransmission control (HARQ-ACK (Hybrid Automatic Repeat reQuest-ACKnowledgment)) and so on. A TTI of 1 ms is also referred to as a "subframe," a "subframe duration" and so forth.

CITATION LIST

Non-Patent Literature

Non-Patent Literature Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Future radio communication systems (for example, 5G, NR, etc.) are expected to realize various radio communication services so as to fulfill varying requirements (for example, ultra high speed, large capacity, ultra-low latency, etc.). For example, NR is under study to provide radio communication services referred to as "eMBB (enhanced Mobile Broad Band)," "mMTC (massive Machine-Type Communication)," "URLLC (Ultra Reliable and Low Latency Communications)," and so on.

Now, envisaging future radio communication systems, studies are underway to introduce TTIs having different time durations than the 1-ms TTIs of existing LTE (for example, LTE Rel. 8 to 13) (for example, TTIs that are shorter than 1-ms TTIs (also referred to as "short TTIs," "sTTIs," etc.)).

When a UE transmits a UL shared channel (for example, UL data) in a short TTI (sTTI), it is preferable to use a design in which the demodulation reference signal (DMRS (De-Modulation Reference Signal)) for use for demodulating data symbols is transmitted in at least one of before, during and after the sTTI.

Also, when UL data is transmitted using an sTTI, there is a possibility that the UL data and the DMRS are transmitted non-contiguously in the time direction (for example, in different sTTIs) depending on the configuration of the sTTI. However, existing LTE has no rules concerning sTTIs, and how to control the transmission of UL data and the DMRS corresponding to this UL data is a problem.

The present invention has been made in view of the above, and it is therefore an object of the present invention to provide a user terminal and a radio communication method, whereby UL transmission can be controlled properly even when uplink data and demodulation reference signals are transmitted using short TTIs.

Solution to Problem

According to one aspect of the present invention, a user terminal has a transmission section that transmits a UL signal and a reference signal for use for demodulating the UL signal, and a control section that controls allocation of the UL signal and the reference signal, and, when UL signals are allocated to a plurality of contiguous predetermined time intervals (sTTIs), respectively, the control section allocates the UL signal and the reference signal for use for demodulating the UL signal to a same sTTI, at least in an sTTI apart from a top sTTI.

Advantageous Effects of Invention

According to the present invention, even when uplink data and demodulation reference signals are transmitted using short TTIs, UL transmission can be controlled properly.

BRIEF DESCRIPTION OF DRAWINGS

FIGS. 1A and 1B provide diagrams to show examples of sTTI configurations;

DESCRIPTION OF EMBODIMENTS

Figure 2:
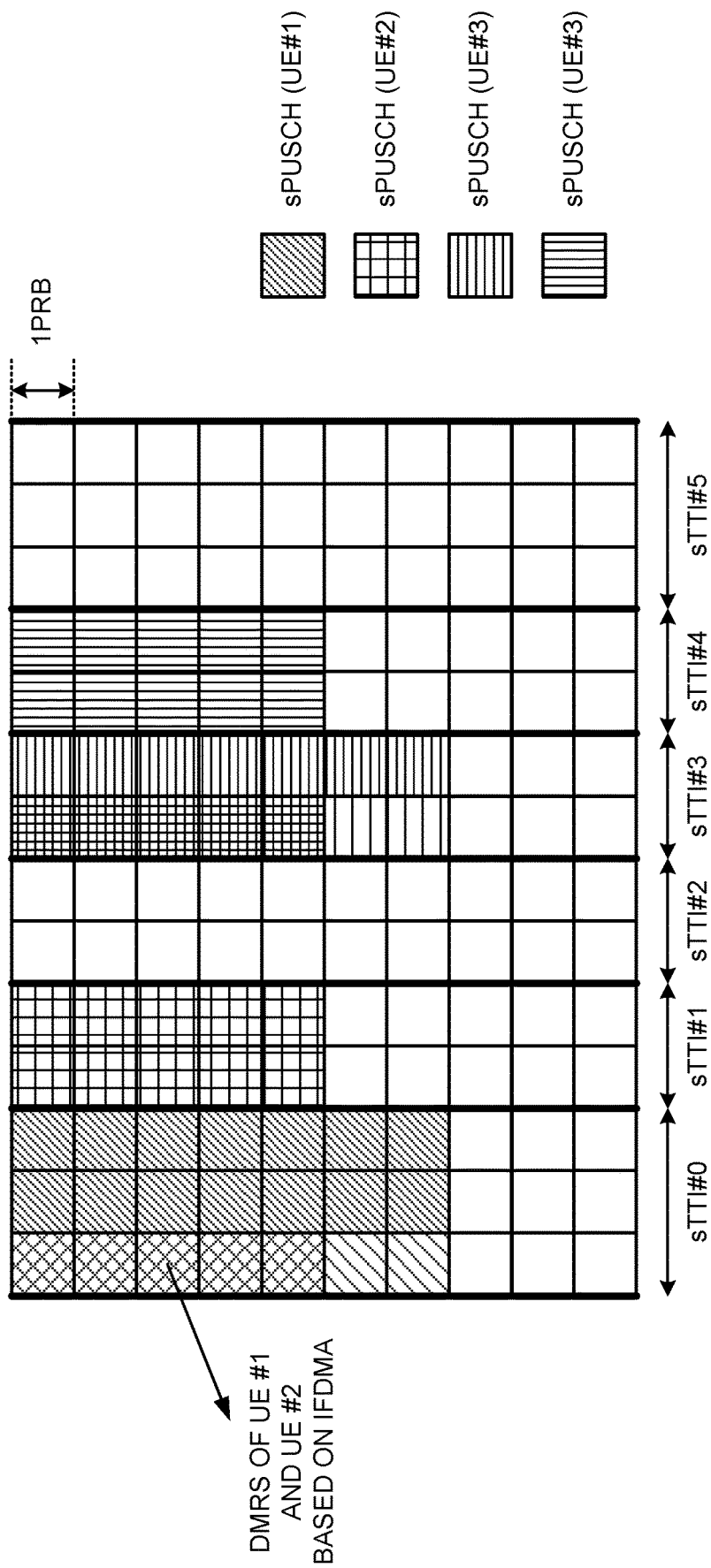
FIG. 2 is a diagram to explain DMRSs for demodulating UL data of different sTTIs.

To provide a method of reducing latency in communication in LTE, study is presently conducted to control transmission/receipt of signals by introducing shortened TTIs (sTTIs) having shorter durations than existing transmission time intervals (TTIs) (for example, subframes (of 1 ms)). Also, envisaging 5G/NR, study is in progress to allow a UE to use different services simultaneously. In this case, the duration of TTIs may be changed depending on services.

Note that a TTI may represent the time unit for use when transmitting/receiving transport blocks for transmitting/receiving data, code blocks and/or codewords. Assuming that a TTI is provided, the period of time (for example, the number of symbols) where the transport blocks, the code blocks and/or the codewords of data are actually mapped may be shorter than the TTI.

For example, when a TTI is formed with a predetermined number of symbols (for example, 14 symbols), the transport blocks, the code blocks and/or the codewords of transmitting/receiving data can be transmitted and received in one or a predetermined number of symbol periods among these. If the number of symbols in which transport blocks, code blocks and/or codewords of transmitting/receiving data are transmitted/received is smaller than the number of symbols constituting the TTI, reference signals, control signals and so on can be mapped to symbols in the TTI where no data is mapped.

In this way, in either LTE or NR, both long TTIs and short TTIs may be used for transmission and/or receipt in UEs.

A long TTI refers to a TTI having a longer time duration than a short TTI (for example, a TTI having a time duration of 1 ms, like existing subframes (TTIs in LTE Rel. 8 to 13)), and may be referred to as a "normal TTI (nTTI)," a "1-ms TTI," a "normal subframe," a "long subframe," a "subframe," a "slot," a "long slot," etc. Furthermore, in NR, a long TTI may be referred to as a "TTI with a lower (smaller) subcarrier spacing" (for example, 15 kHz).

A long TTI, for example, has a time duration of 1 ms, and is comprised of 14 symbols (in the event a normal cyclic prefix (CP) is used) or comprised of 12 symbols (in the event an enhanced CP is used). A long TTI may be suitable for services that do not require strict latency reduction, such as eMBB and MTC.

In existing LTE (for example, LTE Rel. 8 to 13), channels that are transmitted and/or received in TTIs (subframes) include a downlink control channel (PDCCH (Physical Downlink Control Channel)), a downlink data channel (PDSCH (Physical Downlink Shared Channel)), an uplink control channel (PUCCH (Physical Uplink Control Channel)), a downlink data channel (PUSCH (Physical Uplink Shared Channel)) and so on.

A short TTI refers to a TTI having a shorter time duration than a long TTI, and may be referred to as a "shortened TTI," a "partial TTI (partial or fractional TTI)," a "shortened subframe," a "partial subframe," a "minislot," a "subslot" and so on. Also in NR, a short TTI may be referred to as a "TTI with a higher (larger) subcarrier spacing (for example, 60 kHz)."

A short TTI is comprised of, for example, fewer symbols (for example, 2 symbols, 7 symbols, and so on) than a long TTI, and the time duration of each symbol (symbol duration) may be the same as that of a long TTI (for example, 66.7 μs). Alternatively, a short TTI may be comprised of the same number of symbols as a long TTI, and the symbol duration of each symbol may be shorter than in a long TTI.

When using short TTIs, the time margin for processing (for example, coding, decoding, etc.) in UEs and/or base stations grows, so that the processing latency can be reduced. Also, when short TTIs are used, it is possible to increase the number of UEs that can be accommodated per unit time (for example, 1 ms). Short TTIs may be suitable for services that require strict latency reduction, such as URLLC.

A UE in which short TTIs are configured would use channels comprised of shorter time units than existing data and control channels. In LTE and NR, for example, as shortened channels to be transmitted and/or received in short TTIs, a shortened downlink control channel (sPDCCH (shortened PDCCH)), a shortened downlink data channel (sPDSCH (shortened PDSCH)), a shortened uplink control channel (sPUCCH (shortened PUCCH)) and a shortened downlink data channel (sPUSCH (shortened PUSCH)) and so on are under research.

It is now under study that data symbols of sPUSCH are mapped selectively in 1 short TTI. Preferably, the DMRS for use for demodulating the data symbols is transmitted in at least one of before, during and after this short TTI. That is, data symbols and DMRSs may be time-division-multiplexed (TDM (Time Division Multiplexing)) and allocated. Also, data symbols and DMRSs may be mapped to contiguous radio resources, and mapped to radio resources that are not contiguous (not adjacent) in the time and/or frequency domain.

FIG. 1 show examples of configurations of short TTIs. FIG. 1 show cases where 1 subframe (14 OFDM symbols) is segmented in a predetermined section, and a plurality of short TTIs are provided. In FIG. 1A, 1 subframe is segmented into 3, 2, 2, 2, 2 and 3 symbols, and short TTIs (sTTIs #0 to #5) are configured. sTTIs #0 and #5 are constituted by 3 symbols, and sTTI #1 to #4 are constituted by 2 symbols. This configuration is also referred to as "2-symbol sTTI" (also referred to as "2-OS sTTI," "2 OS (OFDM Symbol)," etc.). Alternatively, this configuration may be referred to as "sTTI configuration 1," "sTTI format 1," and so forth.

In FIG. 1B, 1 subframe is segmented into 7 symbols and 7 symbols, and short TTIs (sTTIs #0 to #1) are configured. sTTI #0 and #1 are constituted by 7 symbols. This configuration is also referred to as "7-symbol sTTI" (also referred to as "7-OS sTTI," "7 OS," etc.). Alternatively, this may be referred to as "sTTI configuration 2," "sTTI format 2," and so forth.

3GPP agrees on a UL 2-symbol sTTI layout, which is based on short TTIs comprised of 2 symbols, as a pattern of short TTIs for the uplink. In the UL 2-symbol-sTTI layout, as shown in FIG. 1A, 1 subframe is segmented into 3, 2, 2, 2, 2 and 3 symbols, and short TTIs (sTTI #0 to #5) are configured. Also, it is agreed that DMRS allocation (which indicates whether or not a DMRS is allocated, its location, etc.) is given to a user terminal in a UL grant (or determined by the user terminal). A DMRS allocation can be allocated in an sTTI before the sTTI associated with the DMRS, or in the same sTTI.

However, when UL transmission is performed by using short TTIs, depending on the configuration of short TTIs and so on, UL data and a DMRS may be allocated non-contiguously in the time direction (for example, allocated to different sTTIs). For example, referring to the configurations shown in FIG. 1, it is not that a DMRS is allocated in every sTTI (all sTTIs), but, when UL data is scheduled in a given sTTI, the DMRS that is used to demodulate this UL data is allocated in a different sTTI. UL data scheduled in a given sTTI and the DMRS for use for demodulating this UL data may be contiguous symbols in time, or may be non-contiguous symbols. Also, multiple pieces of UL data scheduled in different sTTIs may share a DMRS.

As for the method of multiplexing DMRSs when short TTIs are used, it is a possibility to use interleaved frequency division multiple access (IFDMA). IFDMA is a radio access scheme that combines multi-carrier and single-carrier characteristics.

IFDMA can apply unequal frequency resources among multiple UEs and multiplex DMRSs. Frequency resources that are unequal among a plurality of UEs might include, for example, frequency resources that overlap partially, frequency resources where at least one of the lower end and the upper end of the allocated frequency resource is different, and so on.

In addition, as for the method of multiplexing DMRSs when short TTIs are used, the use of cyclic shift (CS) is under research. In this case, it is possible to reserve orthogonality between UEs by applying the same frequency resources and different cyclic shifts to multiple UEs. Note that multiplexing of DMRSs may be controlled by combining IFDMA and cyclic-shifting.

When a single DMRS symbol is shared among multiple sTTIs, the DMRSs of these multiple sTTIs are multiplexed on a single DMRS symbol. When a single DMRS symbol is shared among multiple sTTIs, the DMRSs of these multiple sTTIs may be multiplexed based on cyclic shifts and/or based on comb-tooth-like subcarrier arrangements (hereinafter simply referred to as "combs").

When DMRSs are multiplexed based on combs, subcarriers of combs #0 and #1 are arranged alternately. Different combs (subcarriers) are assigned to the DMRSs of different sTTIs. For example, comb #0 is assigned to the DMRS of sTTI #0, and comb #1 is assigned to the DMRS of sTTI #1. The comb for each sTTI may be specified by a predetermined field (for example, the CS/OCC field) in DCI (for example, comb #0 is used when a predetermined field value=0, and so on), or may be determined in advance depending on which sTTI it is (for example, comb #0 is used in sTTI 1, and so on). Alternatively, each sTTI's comb may be selected depending on which user terminal is using it, (for example, comb #0 may be selected depending on whether the C-RNTI is an even number or an odd number), based on the value of the cell ID or the virtual cell ID (for example, comb #0 may be selected depending on whether the cell ID or the virtual cell ID is an even number or an odd number), based on values specified by higher layer signaling, or by combining any of the above.

Also, when DMRSs are multiplexed using cyclic shifting, the DMRS of each sTTI is generated based on a different cyclic shift index, and mapped to the same DMRS symbol. For example, the DMRS associated with sTTI #0 is generated using cyclic shift index #x, while the DMRS associated with sTTI #1 is generated using cyclic shift index #y. Note that the cyclic shift index of each sTTI may be shown in a predetermined field in DCI (for example, the CS/OCC indicator field, the cyclic shift field, etc.).

FIG. 2 shows an example of DMRS-multiplexing using IFDMA. 1 subframe is segmented into 3, 2, 2, 2, 2 and 3 symbols, and short TTIs (sTTIs #0 to #5) are configured. Now, focus will be on user terminals UE 1 and UE 2 that are DMRS-multiplexed with each other. On one hand, sTTI #0 is scheduled in sPUSCH transmission by user terminal UE 1, and, on the other hand, sTTI #1 is scheduled is sPUSCH transmission by user terminal UE 2. The DMRSs for the sPUSCHs of sTTIs #0 and #1 are multiplexed by IFDMA on a DMRS symbol (first symbol) allocated to sTTI #0. The DMRS for user terminal UE 1 is allocated to the same field as the frequency band (PRBs) where the sPUSCH for user terminal UE 1 is allocated, and, likewise, the DMRS for user terminal UE 2 is allocated to the same field as the frequency band (PRBs) where the sPUSCH for user terminal UE 2 is allocated.

When the base station receives a UL signal of user terminal UE 1, the base station references the DMRS allocated to the DMRS symbol of sTTI #0, and demodulates the sPUSCH of sTTI #0. Also, when the base station receives a UL signal from user terminal UE 2, the base station references the DMRS allocated to the DMRS symbol of sTTI #0, and demodulate the sPUSCH of sTTI #1.

3GPP agrees upon a DMRS-multiplexing method using IFDMA, which supports 2-symbol-based sPUSCHs such as those shown in FIG. 2. It is desirable to apply the same transmission power, or power that is configured based on known offsets, to data and DMRSs in order to make it possible to demodulate the data accurately using these DMRSs. For example, assuming that the same transmission power is used for a DMRS and data, if a comb is applied to the DMRS, looking at frequency domain resource elements, its power spectral density is twice that of the data. In this case, if it is known in advance that the DMRS and the data are transmitted with the same transmission power, the base station can accurately recognize the power ratio of the DMRS resource elements and the data, and demodulate the data symbols accurately. The repetition factor RPF=2 is agreed upon.

When performing UL transmission by using short TTIs (for example, when transmitting an HARQ-ACK in response to DL data and/or when transmitting UL data in response to a UL grant), a UE performs this UL transmission at a predetermined timing. For example, when a short TTI is a 2-symbol TTI (of 2 OSs) (see FIG. 1A), the UE performs UL transmission only after the first timing from the timing a DL signal is received (for example, sTTI #n). The first timing can be, for example, k×sTTIs (of 2 OSs). In this case, the UE performs UL transmission n+k sTTIs later. The value of k may be, for example, 4, 6, 8, 10, 12, and so forth. It may be possible to configure k in different values depending on the processing capability of the user terminal. In this case, it is desirable that the user terminal reports terminal capability information that allows to identify the value of k that can be configured based on the processing capability of the user terminal, to the radio communication base station, in advance.

Now, in another example shown in FIG. 2, contiguous sTTIs #3 and #4 are scheduled for sPUSCH transmission by 1 user terminal UE 3. The frequency band of the sPUSCH scheduled 1 sTTI #3 is different from the frequency band of the sPUSCH scheduled for the other sTTI #3. In this case, user terminal UE 3 multiplexes the DMRSs corresponding to the sPUSCHs to be transmitted in sTTI #3 and sTTI #4, respectively, by using different comb indices.

However, the present inventors have found out that there is a problem that, when a plurality of contiguous sTTIs are scheduled for the same user terminal UE 3, if a plurality of DMRSs corresponding to a number of sTTIs are multiplexed on 1 DMRS symbol by using IFDMA, the PAPR (Peak to Average Power Ratio) increases. Also, the increased possibility of user terminals being "power-limited" is another problem. Furthermore, it is also a problem that the uplink interference to other cells or other user terminals increases.

So, the present inventors have found out that, in the event multiple contiguous sTTIs are scheduled for the same user terminal, an increase in the PAPR can be prevented by applying rules that do not assume that DMRSs for a number of sTTIs are multiplexed on the same DMRS symbol, and arrived at the present invention.

According to one example of the present embodiment, when UL signals are allocated to a plurality of contiguous sTTIs for the same user terminal, the user terminal determines the allocation pattern of reference signals in sTTIs, based on the pattern of sTTIs that are scheduled. As one specific example, if UL signals are allocated to multiple contiguous sTTIs for the same user terminal, at least in sTTIs other than the top sTTI, a UL signal and the reference signal for use for demodulating this UL signal are allocated to the same sTTI. That is, if UL signals are scheduled for a given user terminal in multiple contiguous sTTIs, the user terminal exerts control so that multiple DMRSs to be allocated in different locations in the frequency direction are not allocated to the same time resource.

Also, according to another example of the present embodiment, if UL signals are allocated to multiple contiguous sTTIs, respectively, the user terminal allocates a reference signal so as to cover the frequency field of all the UL signals allocated to the multiple sTTIs. That is, if UL signals are scheduled for a given user terminal in multiple contiguous sTTIs, the user terminal exerts control so that the transmission band for a DMRS that is shared among these multiple UL signals serves as a superset for all UL signals (contiguous sTTIs).

Now, embodiments of the present invention will be described in detail below with reference to the accompanying drawings. According to the herein-contained embodiments, a short TTI (sTTI) can be configured in any way as long as its time length is shorter than that of a long TTI (1 ms). Although examples in which a short TTI is comprised of fewer symbols than a long TTI, and in which each symbol has the same symbol duration as that of a long TTI will be described below, these example can be adequately applied even when a short TTI adopts a symbol duration that is different from that of a long TTI. Note that the examples that will be described below may be applied individually or may be applied in combination.

Also, although the following description will illustrate examples in which a DL signal refers to a UL grant (DCI) that commands the transmission of sPUSCH (for example, UL data), and the UL signal to correspond to this DL signal refers to sPUSCH (UL data), but the present embodiment is not limited to this. For example, similarly, the DL signal may be sPDSCH (for example, DL data), and the UL signal may be HARQ-ACK (for example, sPUCCH) in response to the DL data. Alternatively, a signal that is demodulated using a reference signal can be used as well. The DMRS for use for demodulating the sPUSCH will be exemplified as the reference signal for use for demodulating UL signals, but the present embodiment is not limited to this.

First Example

A first example of the present invention assumes that sPUSCHs (UL signals) are scheduled, for the same user terminal, in each of a number of contiguous sTTIs from sTTI #n to sTTI #(n+k), and that the user terminal employs an allocation method, whereby an sPUSCH and the DMRS (reference signal) for use for demodulating this sPUSCH are allocated to the same sTTI (self-contained), at least in sTTI #(n+1) to sTTI #(n+k) apart from sTTI #n at the top. Here, n and k are arbitrary natural numbers. The DMRS for use for demodulating the UL signal allocated to first sTTI #n is allocated to preceding sTTI #(n−1), which is allocated to another user terminal. The DMRS for first sTTI #n is multiplexed with the DMRS for another user terminal, by means of IFDMA, in the DMRS symbol of sTTI #(n−1). That is, according to the first example, a user terminal changes the mapping of a DMRS depending on whether or not the corresponding sTTI is at the top of a number of contiguous sTTIs where sTTI transmission takes place.

Figure 3:
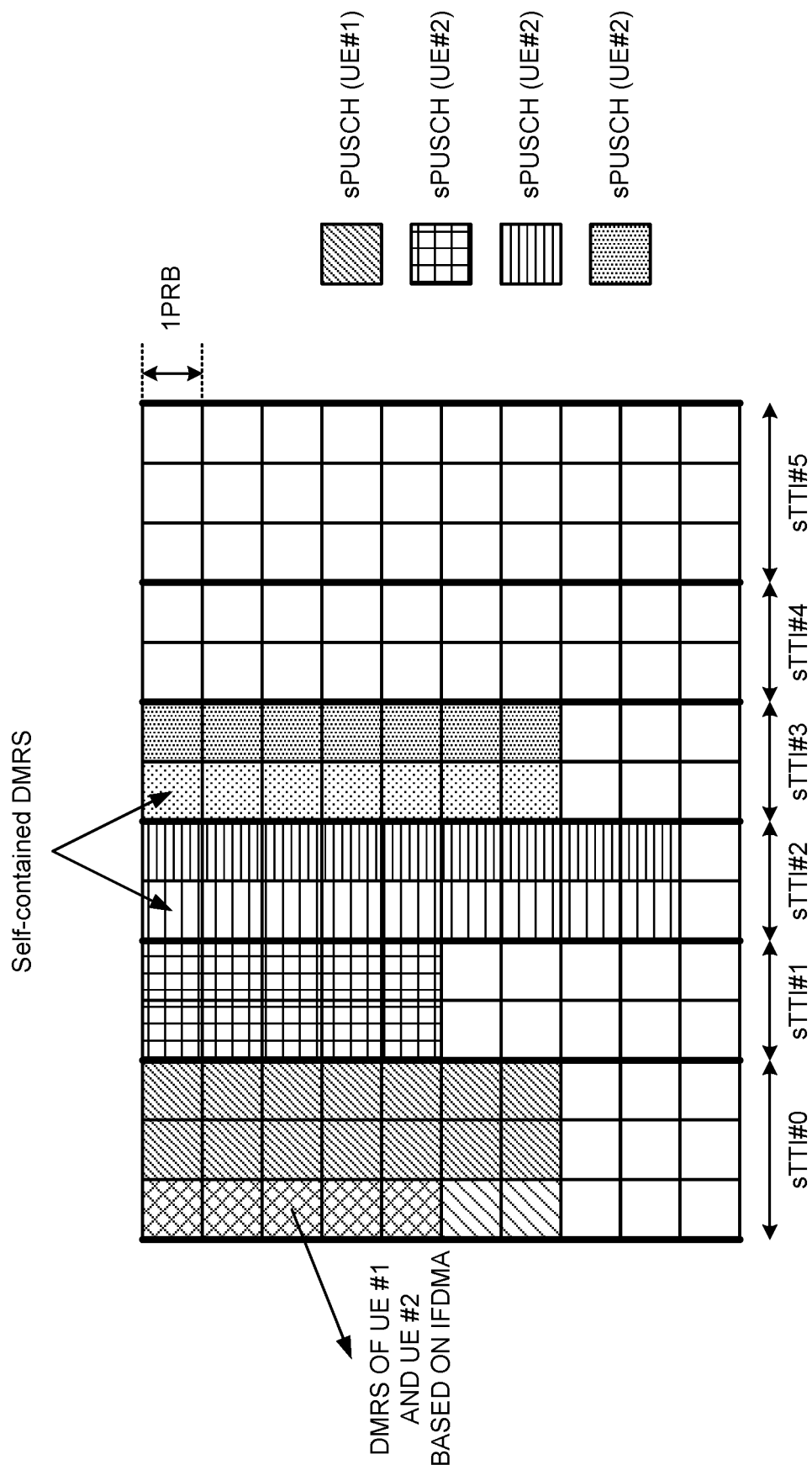
FIG. 3 is a diagram to show an example of the method of allocating UL data and DMRSs according to a first example of the present invention.

FIG. 3 is a diagram to show an example of the method of allocating UL data and DMRSs according to the first example. sPUSCH transmission by user terminal UE 1 and sPUSCH transmission by another user terminal UE 2 are scheduled in adjacent sTTIs. To be more specific, an sPUSCH to be transmitted by user terminal UE 1 is scheduled in sTTI #0. sPUSCHs to be transmitted by another user terminal UE 2 are scheduled in a plurality of contiguous sTTIs #1 to #3. The first symbol of sTTI #0 where the sPUSCH of user terminal UE 1 is scheduled is allocated to the DMRS symbol. The DMRS for sTTI #0 of user terminal UE 1 and the DMRS for sTTI #1 of user terminal UE 2 are multiplexed on the DMRS symbol of sTTI #0.

Given that multiple contiguous sTTI #1 through sTTI #3 are scheduled for user terminal UE 2, at least in each of sTTI #2 and sTTI #3, apart from first sTTI #1, an sPUSCH and the DMRS for use for demodulating this sPUSCH are allocated to the same sTTI (self-contained). To be more specific, in sTTI #2, the DMRS for use for demodulating the sPUSCH allocated to this sTTI #2 is allocated to the DMRS symbol in this sTTI #2. The transmission band of the DMRS allocated to the DMRS symbol of sTTI #2 is controlled to be the same as the transmission band of the sPUSCH allocated in this sTTI #2. Also in sTTI #3, as with sTTI #2, an sPUSCH and the DMRS for use for demodulating this sPUSCH are allocated to same sTTI #3.

Meanwhile, as shown in FIG. 3, the DMRS for sTTI #1, which is the first of multiple contiguous sTTIs, may be multiplexed onto sTTI #0, which is proceeding in time. In preceding sTTI #0, the DMRS for use for demodulating the sPUSCH to be transmitted by user terminal UE 1 is allocated to the DMRS symbol (first symbol) of this sTTI #0. The sPUSCH scheduled in sTTI #0 and the sPUSCH scheduled in sTTI #1 have different transmission bands, and the 2 DMRSs corresponding to these sPUSCHs are multiplexed by IFDMA.

In view of the above, it is possible to say that, when multiple contiguous sTTIs (#1 to #3) are scheduled for sPUSCH transmission, that user terminal UE 2 can allocate DMRSs based on the rule of not assuming that DMRSs for a based on the rule of not assuming that DMRSs for a number of sTTIs may be multiplexed on the same DMRS symbol.

As shown in FIG. 3, in at least sTTI #2 and sTTI #3 other than the first sTTI #1, an sPUSCH and the DMRS for use for demodulating this sPUSCH are allocated to the same sTTI (self-contained). Also, in top sTTI #1, user terminal UE 2 allocates a scheduled sPUSCH to predetermined PRBs, but the DMRS for use for demodulating this sPUSCH is multiplexed on the DMRS symbols of sTTI #0, which is preceding in time, based on IFDMA. Since user terminals UE 1 and UE 2 share the DMRS symbols in sTTI #0, different comb indices are reported in advance from the base station to user terminals UE 1 and UE 2.

According to the first example, when multiple contiguous sTTIs are scheduled for a user terminal, it is possible to prevent multiple DMRSs for use for demodulating sPUSCHs transmitted in multiple sTTIs from concentrating on 1 DMRS symbol, thereby solving the problem that the PAPR increases.

Second Example

With a second example of the present invention, when multiple contiguous sTTIs are scheduled for the same user terminal, the user terminal exerts controls so that the transmission band of a DMRS that is shared among these multiple sPUSCHs serves as a superset. A "superset" as used herein may be the concept that the transmission band of a DMRS covers the frequency fields of all sPUSCHs allocated in multiple sTTIs.

For example, if multiple contiguous sTTIs are scheduled, the user terminal allocates a DMRS to share among multiple sPUSCHs (also referred to as "shared DMRS"), allocated to the multiple sTTIs, in one of the sTTIs, and allocates this DMRS so that the transmission bandwidth of this DMRS covers the frequency fields of all the sPUSCHs allocated to these multiple sTTIs. Therefore, the user terminal transmits this DMRS, covering the frequency fields of all sPUSCHs allocated to multiple sTTIs, and the sPUSCH of the sTTI where the symbol to transmit this DMRS is included, in different transmission bands (bandwidths).

Here, the base station can indicate that the number of PRBs and the MCS for UL signals in multiple contiguous sTTIs change per sTTI, and the transmission power be the same in all sTTIs. Meanwhile, the user terminal assumes that the number of PRBs and the MCS for UL signals in multiple contiguous sTTIs may be changed per sTTI, but assumes that, even then, the transmission power is fixed in all sTTIs.

Furthermore, the base station includes DMRS parameters, including transmission bands (the numbers of PRBs), cyclic shift indices (values), and comb indices, in UL grants, and transmits these to the user terminal. Meanwhile, the user terminal assumes that DMRS parameters for multiple contiguous sTTIs are included in UL grants or higher layer signaling and reported.

Figure 4:
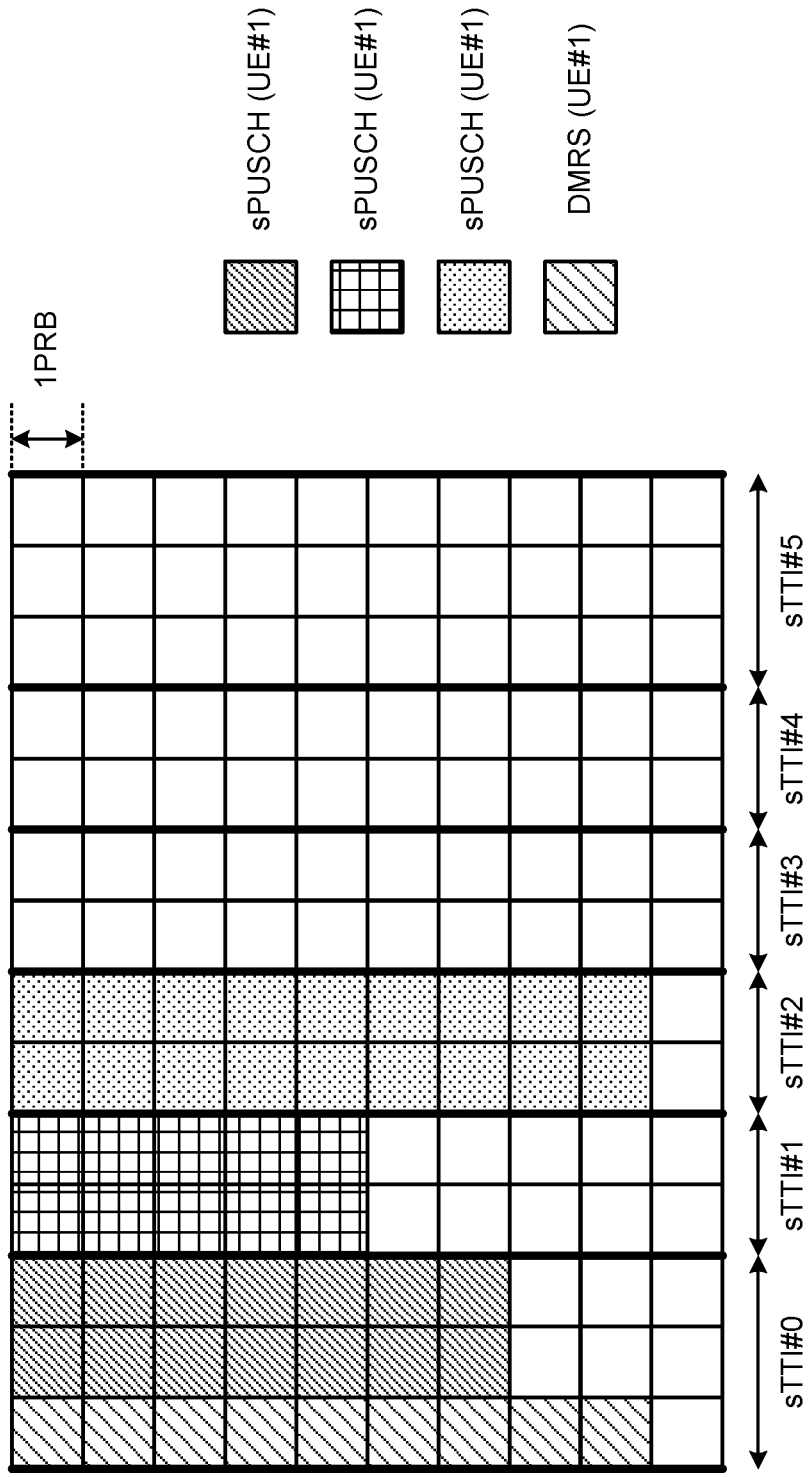
FIG. 4 is a diagram to show an example of the method of allocating UL data and DMRSs according to a second example of the present invention.

FIG. 4 is a diagram to show an example of the method of allocating UL data and DMRSs according to the second example. A case is shown here where sPUSCHs are scheduled, for user terminal UE 1, in each of multiple contiguous sTTIs #0 to #2. According to the second example, a user terminal shares a DMRS among the sPUSCHs scheduled respectively in multiple sTTIs #0 to #2. This shared DMRS is allocated in the DMRS symbol of sTTI #0. Among multiple contiguous sTTIs #0 to #2, the number of PRBs is the maximum in the sPUSCH allocated to sTTI #2. The user terminal selects a transmission band to match the number of PRBs of the sPUSCH of sTTI #2 as the transmission band for the shared DMRS allocated to sTTI #0.

With the second example, when contiguous sTTIs #0 to #2 are scheduled for the same user terminal UE 1, 1 UL grant schedules 1 sTTI (case 1). UL grants that correspond to each sTTI (#0 to #2) includes parameters related to the sPUSCH transmitted in the corresponding sTTI, and parameters related to the DMRS for use for demodulating the sPUSCH. According to the second example, sPUCCHs share a DMRS, so that a user terminal can assume that the DMRS-related parameters are the same parameters in all UL grants. That is, the user terminal may identify DMRS-generating parameters based on one of UL grants that each schedule an sPUSCH sharing a DMRS.

Alternatively, according to the second example, the user terminal may recognize DMR-generation parameters based on a specific one of UL grants that each schedule an sPUSCH sharing a DMRS. By setting the UL grant that schedules the earliest sPUSCH in time as the above-described specific one, it is possible to reserve the time it takes for the user terminal to generate the DMRS, and reduce the burden on the user terminal. By setting the UL grant to schedule the latest sPUSCH in time as the above-described specific one, the scheduler of the base station can flexibly control the frequency allocation for a plurality of sPUSCHs that share the DMRS.

Parameters related to an sPUSCH include the number of PRBs allocated to the sPUSCH and information about the MCS (Modulation and Coding Scheme) applied to the sPUSCH. Parameters related to a DMRS include a cyclic shift index and a comb index. If contiguous sTTIs are not scheduled, the user terminal uses the same frequency field as the sPUSCH transmission band as the transmission band for the DMRS. The transmission band for the sPUSCH is indicated in the form of the number of PRBs in the RA field included in the UL grant.

In case 1, 1 sTTI is scheduled by 1 UL grant, so that a plurality of UL grants, respectively corresponding to a number of sTTIs (#0 to #2), designate each sPUSCH's transmission band separately. The user terminal detects the number of PRBs from the RA field in each of the multiple UL grants, and selects the maximum number of PRBs as the transmission band for the DMRS from among them. Amongst the numbers of PRBs indicated in the RA fields of all UL grants, the maximum number of PRBs indicates the transmission band that covers the frequency fields of all sPUSCHs allocated to multiple sTTIs.

In case 1, the number of PRBs and the MCS for an sPUSCH are assigned per sTTI (#0 to #2), by individual UL grants, and, so that, as shown in FIG. 4, the number of PRBs for an sPUSCH (allocation location in the frequency direction) can be configured all independently in sTTIs #0 to #2, and different PRBs can be configured between sTTIs. At this time, transmission power may be controlled to be the same in all of sTTIs #0 to #2.

Also, if contiguous sTTIs (#0 to #2) are scheduled for the same user terminal UE 1, all of these multiple contiguous sTTIs (#0 to #2) may be scheduled for the user terminal UE 1 with 1 UL grant (case 2). The user terminal assumes that all of the multiple contiguous sTTIs (#0 to #2) are scheduled by 1 shared UL grant.

In case 2, a shared UL grant corresponding to a plurality of contiguous sTTIs (#0 to #2) may include parameters related to the sPUSCH transmitted in each sTTI and parameters related to the shared DMRS for use for demodulating each sPUSCH. The DMRS-related parameters are used in common for demodulating the sPUSCHs transmitted in the contiguous sTTIs (#0 to #2). The parameters related to the DMRS include the cyclic shift index and the comb index to apply to the DMRS.

The shared UL grant transmitted by the base station may be configured with a shared RA field or an independent RA field. A shared RA field can be shared among the sPUSCHs transmitted in multiple sTTIs (#0 to #2), and shows a shared or an individual PBR. An independent RA field can indicate the number of PRBs, independently, for each sPUSCH that is transmitted in multiple sTTIs (#0 to #2). When an independent RA field is configured for each sPUSCH, the user terminal uses the maximum number of PRBs from among the RA fields corresponding to all of the contiguous sTTIs (#0 to #2) as the DMRS transmission band.

Also, from the RA field corresponding to each sTTI (#0 to #2), the user terminal acquires the numbers of PRBs to allocate to the sPUSCH. Therefore, in case 2, as shown in FIG. 4, different numbers of PRBs can be assigned to the sPUSCHs of sTTIs #0 to #2. The transmission power at this time may be controlled to be the same in all of sTTIs #0 to #2.

Also, if contiguous sTTIs (#0 to #2) are scheduled for the same user terminal UE 1, this user terminal may use a DMRS-specific UL grant, which can schedule DMRS transmission alone (case 3). This UL grant includes, as minimum parameters for DMRS transmission, the DMRS transmission band (including one indicated in the form of the number of PRBs), the cyclic shift index to apply to the DMRS, and the comb index. The minimum parameters for the DMRS are indicated in the RA field of the UL grant.

When DMRS transmission is commanded by a DMRS-specific UL grant, the user terminal determines the DMRS transmission band and the signal sequence based on the RA field of the DMRS-specific UL grant, and transmits the DMRS. In case 3, the user terminal assumes that the DMRS transmission band indicated by the DMRS-specific UL grant covers the frequency fields of all sPUSCHs allocated to multiple contiguous sTTIs.

With one or more UL grants, parameters related to the sPUSCH transmitted in each sTTI are reported to the user terminal. The number of PRBs for each sPUSCH is indicated by the RA fields of the UL grants. Allocation locations in the frequency direction for the sPUSCHs allocated to multiple sTTIs, respectively, are independently configured. UL grant to include parameters related to the sPUSCH may or may not include parameters related to a common DMRS.

Third Example

With a third example of the present invention, when sPUSCHs are scheduled for multiple contiguous sTTIs for the same user terminal, all of the sPUSCHs allocated to these contiguous sTTIs use the same transmission band. The user terminal sets the allocation locations in the frequency direction of the sPUSCHs, respectively allocated to the multiple sTTIs, to be the same.

In the third example, the same MCS, the same number of PRBs, and the same transmission power are assigned to the user terminal between contiguous sPUSCHs. If the base station schedules sPUSCHs in multiple contiguous sTTIs for the same user terminal, the base station may use, limitedly, the same MCS, the same number of PRBs and the same transmission power among the contiguous sPUSCHs.

Figure 5:
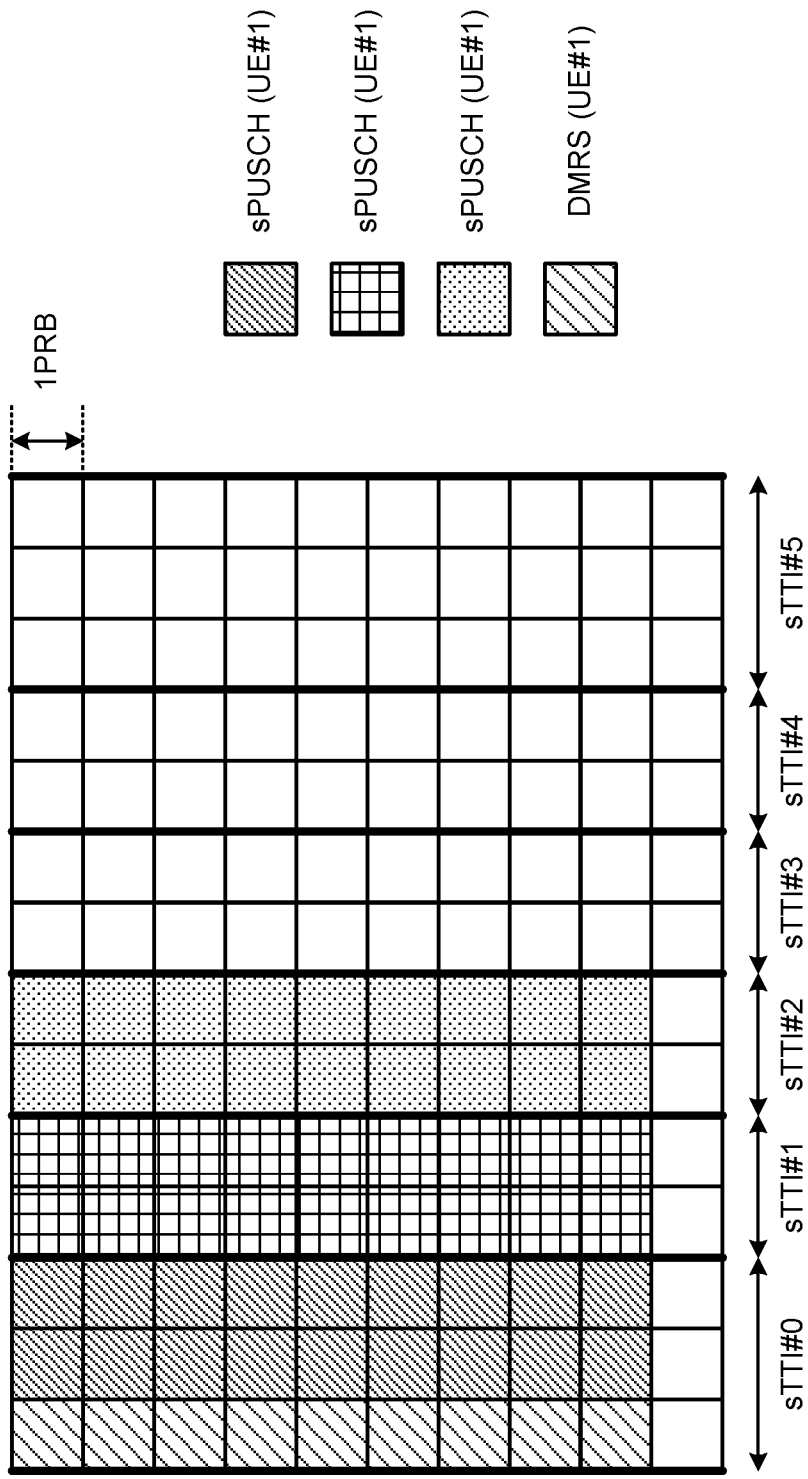
FIG. 5 is a diagram to show an example of the method of allocating UL data and DMRSs according to a third example of the present invention.

FIG. 5 is a diagram to show an example of the method of allocating UL data and DMRSs according to the third example. In the case shown here, sPUSCHs are scheduled for user terminal UE 1 in a plurality of contiguous sTTIs #0 to #2, respectively. The DMRSs shared among the sPUSCHs, scheduled respectively in these multiple contiguous sTTI #0 to sTTI #2, are allocated to the DMRS symbols of sTTI #0. The same MCS, number of PRBs and transmission power are assigned to all the sPUSCHs allocated to contiguous sTTIs #0 to #2.

When contiguous sTTIs (#0 to #2) are scheduled, user terminal UE 1 allocates a shared DMRS in the first symbol (DMRS symbol) of sTTI #0, which is the earliest in time. At this time, for the DMRS transmission band, a common number of PRBs is used between the sPUSCHs. By this means, the transmission band for the shared DMRS is allocated so as to cover the frequency fields of all the sPUSCHs allocated to the multiple sTTIs.

(Radio Communication System)

Now, the structure of a radio communication system according to the present embodiment will be described below. In this radio communication system, the radio communication methods according to the above-described embodiments are employed. Note that the radio communication method according to each embodiment described above may be used alone or may be used in combination.

Figure 6:
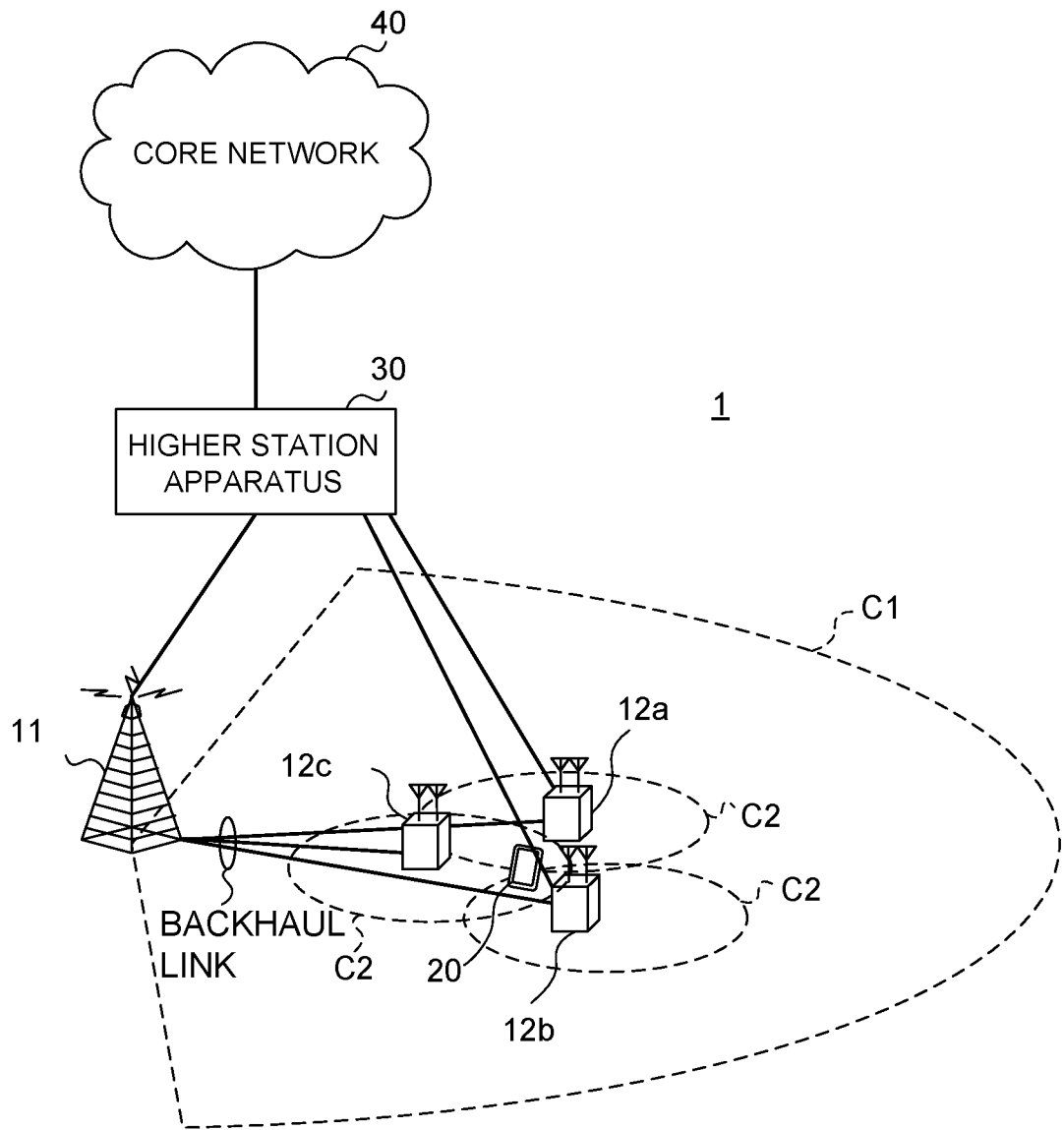
FIG. 6 is a diagram to show an exemplary schematic structure of a radio communication system according to the present embodiment.

FIG. 6 is a diagram to show an exemplary schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 6 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure may be adopted here in which different numerologies (for example, different TTI lengths, and/or processing times, and so on) are used between cells. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells. Note that a structure may be employed here in which an FDD carrier and/or a TDD carrier, which use shortened TTIs, may be included in one of the cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that frequency bands that are used in each radio base station are by no means limited to these structures.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL.

In the radio communication system 1, a DL data channel (PDSCH (Physical Downlink Shared CHannel), also referred to as a DL shared channel and/or the like), which is used by each user terminal 20 on a shared basis, a broadcast channel (PBCH (Physical Broadcast CHannel)), L1/L2 control channels and so on are used as DL channels. User data, higher layer control information and SIBs (System Information Blocks) are communicated in the PDSCH. Also, the MIB (Master Information Block) is communicated in the PBCH.

The L1/L2 control channels include a DL control channel (a PDCCH (Physical Downlink Control CHannel), an EPDCCH (Enhanced Physical Downlink Control CHannel)), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement information (ACK/NACK) in response to the PUSCH is communicated by the PHICH. The EPDCCH is frequency-division-multiplexed with the PDSCH (downlink shared data channel) and used to communicate DCI and so on, like the PDCCH.

In the radio communication system 1, a UL data channel (PUSCH (Physical Uplink Shared CHannel), also referred to as a UL shared channel and/or the like), which is used by each user terminal 20 on a shared basis, an UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI (Uplink Control Information)), including at least one of delivery acknowledgment information (ACK/NACK) and radio quality information (CQI) and so on, is transmitted by the PUSCH or the PUCCH. By means of the PRACH, random access preambles for establishing connections with cells are communicated.

(Radio Base Station)

Figure 7:
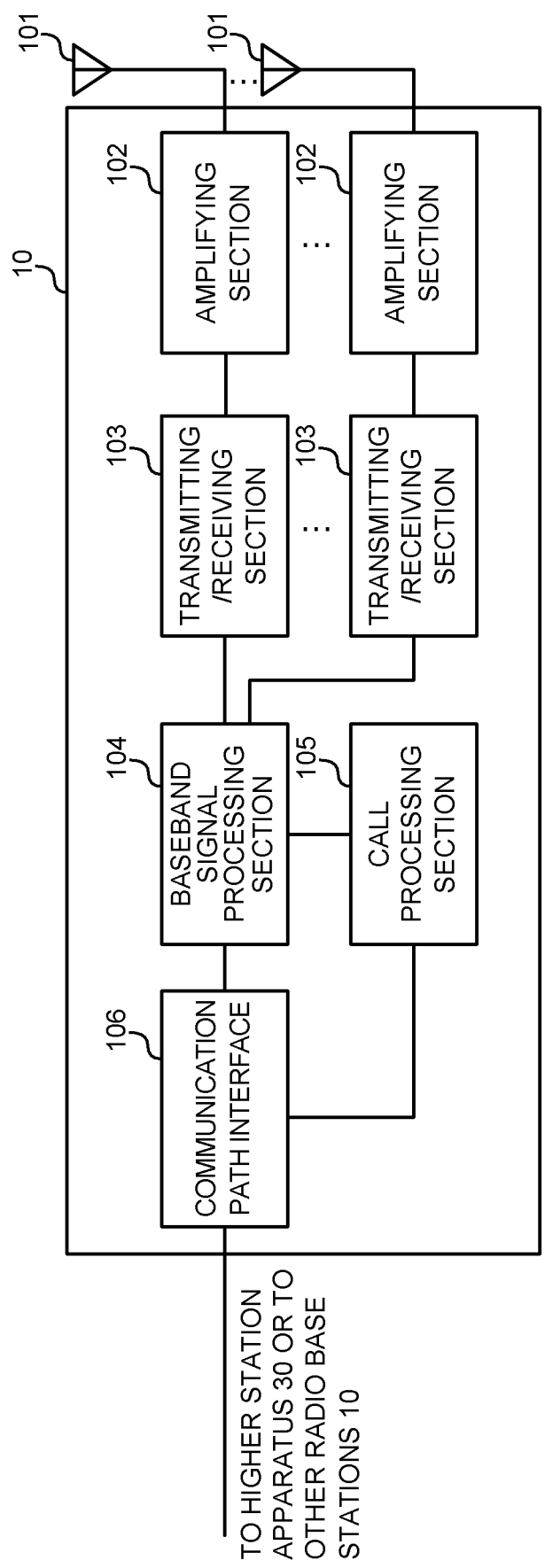
FIG. 7 is a diagram to show an exemplary overall structure of a radio base station according to the present embodiment.

FIG. 7 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

DL data to be transmitted from the radio base station 10 to a user terminal 20 is input from the higher station apparatus 30 to the baseband signal processing section 104, via the communication path interface 106.

In the baseband signal processing section 104, the DL data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to the transmitting/receiving sections 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signals (for example, DL control signals (DL control channels), DL data signals (DL data channels, DL shared channels and so on), DL reference signals (DM-RS, CSI-RS and so on), discovery signals, synchronization signals, broadcast signals and so on), and receive UL signals (for example, UL control signals (UL control channels), UL data signals (UL data channels, UL shared channels and so on), UL reference signals and so on).

To be more specific, the transmitting/receiving sections 103 receive a UL signal and the UL reference signal for use for demodulating this UL signal, transmitted from a user terminal, by using the same transmission time interval or different transmission time intervals. In addition, the transmitting/receiving sections 103 report information about the location where the UL reference signal (DMRS) is allocated in a predetermined short TTI (DMRS pattern), to the user terminal. Furthermore, the transmission/receiving sections 103 may report information about the modulation scheme that the user terminal applies to the UL signal (for example, sPUSCH). The transmitting/receiving sections of the present invention are constituted by a transmitting/receiving section 103 and/or a communication path interface 106.

Figure 8:
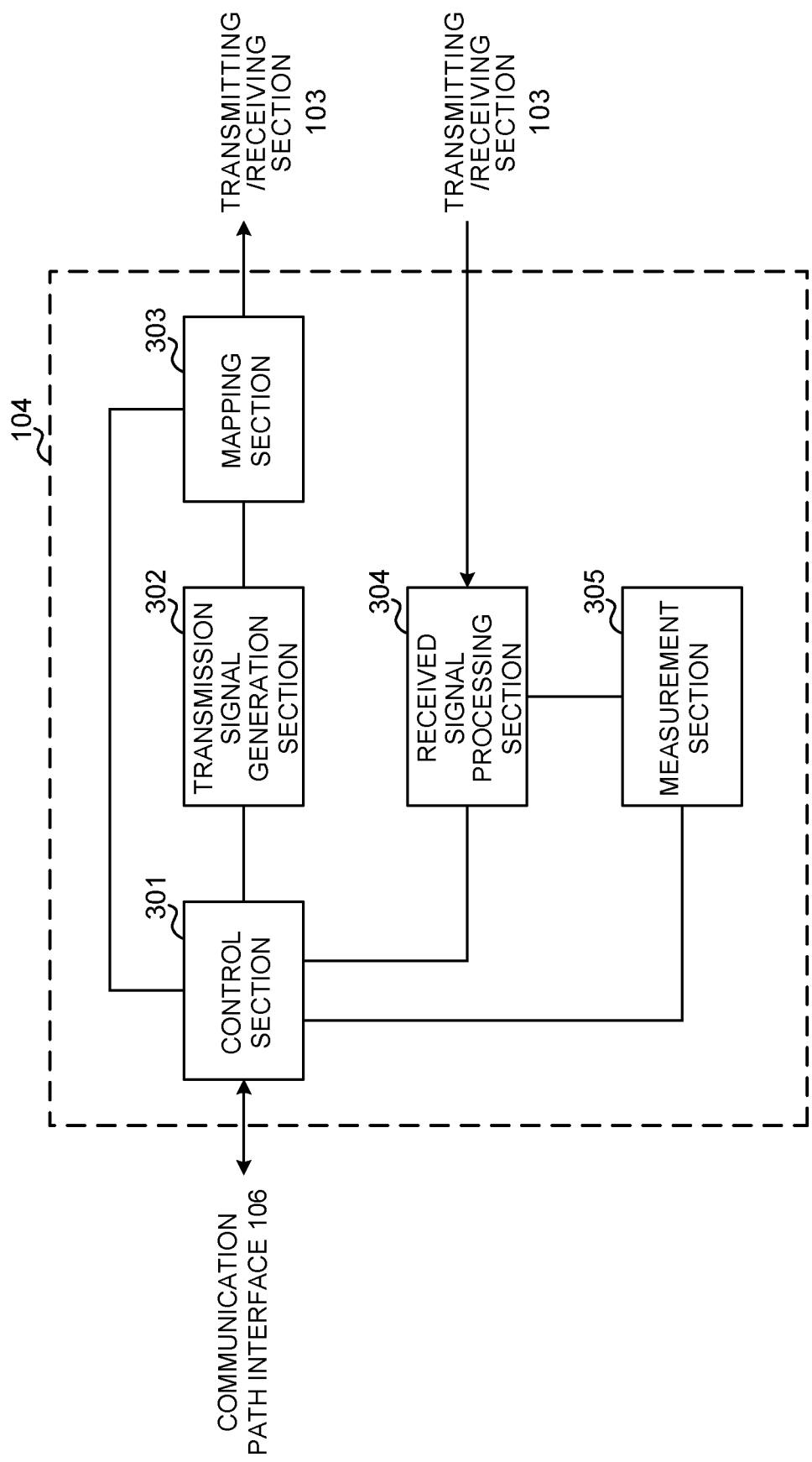
FIG. 8 is a diagram to show an exemplary functional structure of a radio base station according to the present embodiment.

FIG. 8 is a diagram to show an exemplary functional structure of a radio base station according to the present embodiment. Note that, although FIG. 8 primarily shows functional blocks that pertain to characteristic parts of the present embodiment, the radio base station 10 may have other functional blocks that are necessary for radio communication as well. As shown in FIG. 8, the baseband signal processing section 104 at least has a control section 301, a transmission signal generation section 302, a mapping section 303, a received signal processing section 304 and a measurement section 305.

The control section 301 controls the whole of the radio base station 10. The control section 301 can be constituted by a controller, a control circuit or control apparatus that can be described based on general understanding of the technical field to which the present invention pertains.

The control section 301, for example, controls generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls scheduling (for example, resource allocation) of DL signals and/or UL signals. To be more specific, the control section 301 controls the transmission signal generation section 302, the mapping section 303 and the transmitting/receiving sections 103 to generate and transmit DCI (DL assignment) that includes DL data channel scheduling information and DCI (UL grant) that includes UL data channel scheduling information.

The control section 301 schedules multiple contiguous sTTIs #n to #(n+k) for the same user terminal. In this case, at least in sTTI #(n+1) to sTTI #(n+k), apart from first sTTI #n at the top, an sPUSCH and the DMRS for use for demodulating this sPUSCH are allocated to the same sTTI (self-contained) (first example).

Also, when multiple contiguous sTTIs are scheduled for the same user terminal, the user terminal exerts controls so that the transmission band of a DMRS that is shared among these multiple sPUSCHs serves as a superset (second example). At this time, 1 UL grant may schedule 1 sTTI (case 1). These multiple contiguous sTTIs may be all scheduled by 1 UL grant (case 2). Also, specific UL grants that can schedule DMRS transmission alone may be transmitted (case 3).

When sPUSCHs are scheduled for the same user terminal in multiple contiguous sTTIs, the control section 301 may use the same transmission band for all of the sPUSCHs allocated to these contiguous sTTIs (third example).

The transmission signal generation section 302 generates DL signals (DL control channels, DL data channels, DL reference signals such as DM-RSs, and so on) as commanded (indicated) from the control section 301, and outputs the DL signals to the mapping section 303. The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302 to predetermined radio resources, as commanded from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals transmitted from the user terminals 20 (UL control channels, UL data channels, UL reference signals and so on). Based on an uplink reference signal that is transmitted from the user terminal, the received signal processing section 304 controls the demodulation process and/or other processes of the corresponding UL signal (for example, sPUSCH). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, the received signal processing section 304 outputs at least one of a preamble, control information and UL data, to the control section 301. Also, the received signal processing section 304 outputs the received signals, the signals after the receiving processes and so on, to the measurement section 305.

The measurement section 305 conducts measurements with respect to the received signal. The measurement section 305 can be constituted by a measurer, a measurement circuit or measurement apparatus that can be described based on general understanding of the technical field to which the present invention pertains.

The measurement section 305 may measure the received power (for example, RSRP (Reference Signal Received Power)), the received quality (for example, RSRQ (Reference Signal Received Quality)), channel states and so on of the received signals. The measurement results may be output to the control section 301.

(User Terminal)

Figure 9:
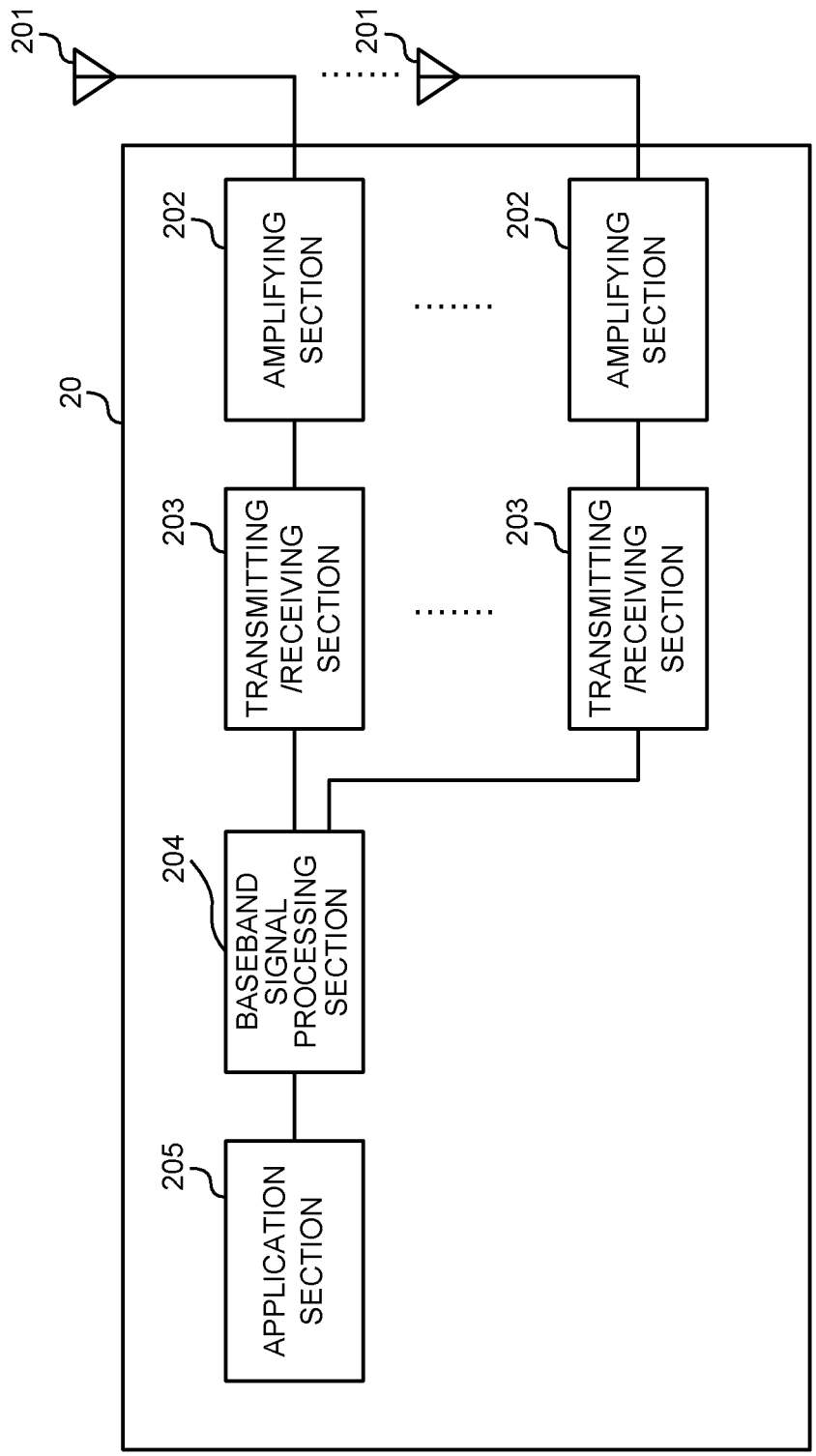
FIG. 9 is a diagram to show an exemplary overall structure of a user terminal according to the present embodiment.

FIG. 9 is a diagram to show an exemplary overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. The DL data is forwarded to the application section 205. The application section 205 performs processes related to higher layers above the physical layer and the MAC layer, and so on. Also, in the DL data, system information and higher layer control information are also forwarded to the application section 205.

Meanwhile, UL data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive DL signals (for example, DL control signals (DL control channels), DL data signals (DL data channels, DL shared channels and so on), DL reference signals (DM-RS, CSI-RS and so on), discovery signals, synchronization signals, broadcast signals and so on), and transmit UL signals (for example, UL control signals (UL control channels), UL data signals (UL data channels, UL shared channels and so on), UL reference signals and so on).

To be more specific, the transmitting/receiving sections 203 transmits a UL signal and the UL reference signal for use for demodulating this UL signal, by using the same transmission time interval or different transmission time intervals. In addition, the transmitting/receiving sections 203 receive information about the location where the UL reference signal (DMRS) is allocated in a predetermined short TTI (DMRS pattern), to the user terminal. Furthermore, the transmission/receiving sections 203 may receive information about the modulation scheme that the user terminal applies to the UL signal (for example, sPUSCH).

Figure 10:
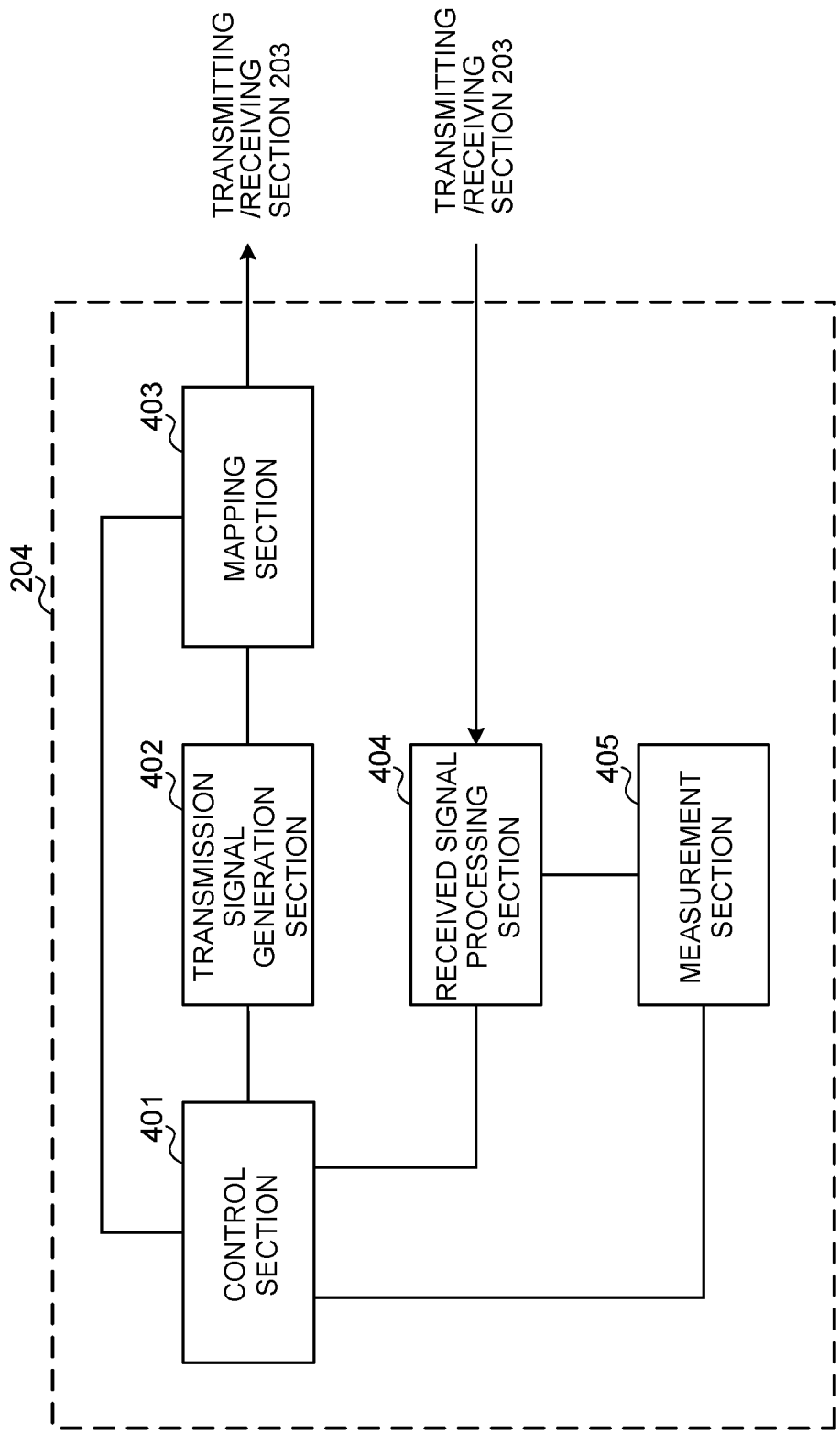
FIG. 10 is a diagram to show an exemplary functional structure of a user terminal according to the present embodiment.

FIG. 10 is a diagram to show an exemplary functional structure of a user terminal according to the present embodiment. Note that, although FIG. 10 primarily shows functional blocks that pertain to characteristic parts of the present embodiment, the user terminal 20 may have other functional blocks that are necessary for radio communication as well. As shown in FIG. 10, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls generation of signals in the transmission signal generation section 402, allocation of signals in the mapping section 403, and so on. Furthermore, the control section 401 controls signal receiving processes in the received signal processing section 404, measurements of signals in the measurement section 405, and so on.

If sPUSCHs (UL signals) are scheduled for the same user terminal in multiple contiguous sTTIs from sTTI #n to sTTI #(n+k), respectively, at least in sTTI #(n+1) to sTTI #(n+k), apart from sTTI #n at the top, an sPUSCH and the DMRS (reference signal) for use for demodulating this sPUSCH are allocated to the same sTTI (first example). The DMRS to use to demodulate the UL signal allocated to top sTTI #n is multiplexed with another user terminal's DMRS by means of IFDMA in the DMRS symbol of preceding sTTI #(n−1).

Also, when multiple contiguous sTTIs are scheduled, the control section 401 may exert control so that a DMRS (shared DMRS) to be shared among multiple sPUSCHs that are allocated to the multiple sTTIs is allocated in 1 sTTI, and the transmission band of this DMRS covers the frequency fields of all the sPUSCHs allocated to these multiple sTTIs (second example). At this time, 1 UL grant may schedule 1 sTTI (case 1). Alternatively, it may be assumed that all of multiple contiguous sTTIs are scheduled by 1 shared UL grant (case 2). Alternatively, individual UL grants may only schedule DMRS transmissions (case 3).

Also, if sPUSCHs are scheduled in multiple contiguous sTTIs, the control section 401 may assume that all of the sPUSCHs allocated to these contiguous sTTIs use the same transmission band (third example).

The transmission signal generation section 402 generates UL signals (UL control channels, UL data signals, UL reference signals and so on) as commanded from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

The mapping section 403 maps the UL signals generated in the transmission signal generation section 402 to radio resources as commanded from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, DL signals transmitted from the radio base station 10 (DL control channels, DL data channels, DL reference signals and so on). The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from control section 401, the received signal processing section 404 performs blind decoding of a DL control channel, which schedules transmission and/or receipt of a DL data channel, and performs receiving processes for the DL data channel based on this DCI. In addition, the received signal processing section 404 estimates channel gain based on the DM-RS or the CRS, and demodulates the DL data channel based on the estimated channel gain.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of data to the control section 401. Also, the received signal processing section 404 outputs the received signals, the signals after the receiving processes and so on, to the measurement section 405.

The measurement section 405 conducts measurements with respect to the received signals. For example, the measurement section 405 measures channel states based on reference signals (CSI-RSs) for channel state measurements, transmitted from the radio base station. The measurement section 405 may measure, for example, the received signals' received power (for example, RSRP), DL received quality (for example, RSRQ) and so on. The measurement results may be output to the control section 401. The measurement section 405 can be constituted by a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 11:
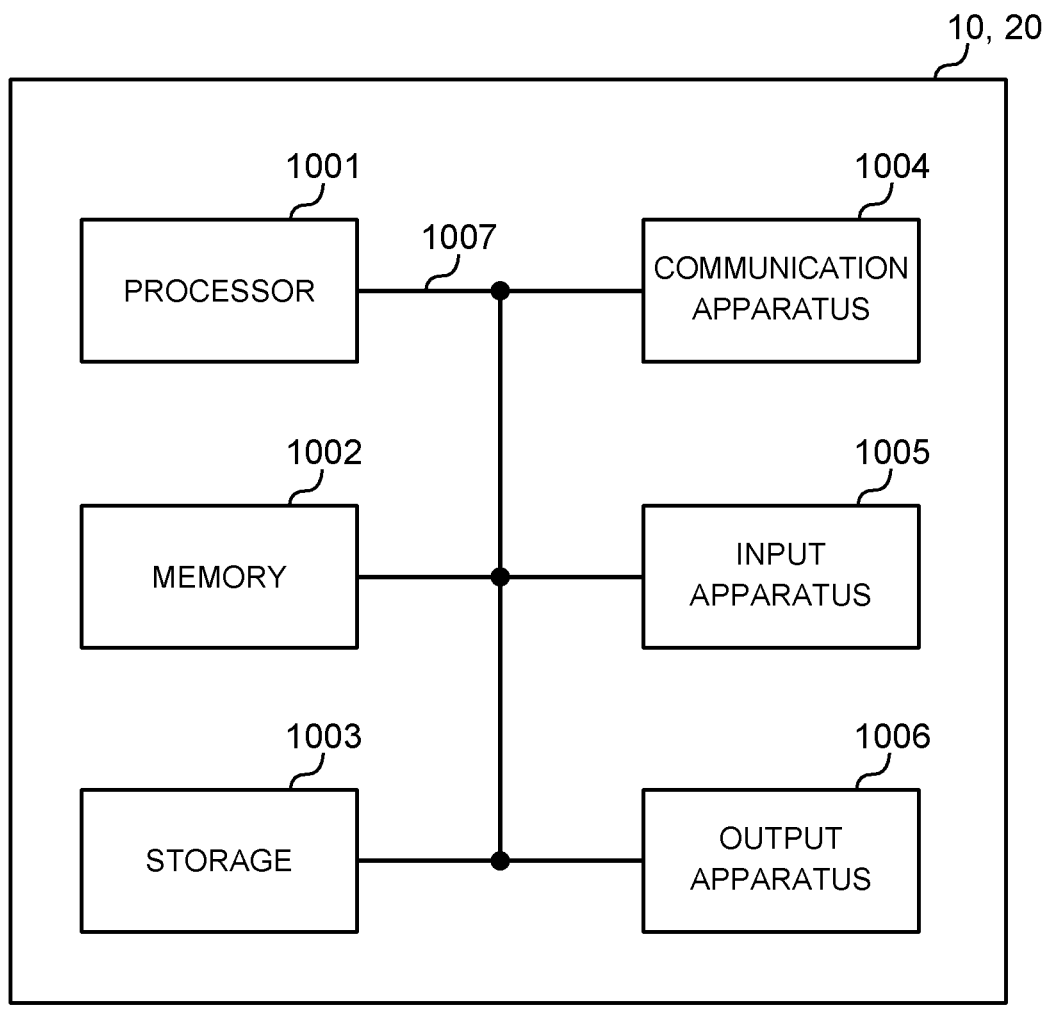
FIG. 11 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 11 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, 1 subframe may be referred to as a "transmission time interval (TTI)," or a plurality of consecutive subframes may be referred to as a "TTI," and 1 slot may be referred to as a "TTI." That is, a subframe and a TTI may be a subframe (1 ms) in existing LTE, may be a shorter period than 1 ms (for example, 1 to 13 symbols), or may be a longer period of time than 1 ms.

Here, a TTI refers to the minimum time unit of scheduling in radio communication, for example. For example, in LTE systems, a radio base station schedules radio resources (such as the frequency bandwidth and transmission power that can be used in each user terminal) to allocate to each user terminal in TTI units. Note that the definition of TTIs is by no means limited to this. TTIs may be transmission time units for channel-encoded data packets (transport blocks), or may be the unit of processing in scheduling, link adaptation and so on.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 subframe or 1 TTI in length. 1 TTI and 1 subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, 1 RE may be a radio resource field of 1 subcarrier and 1 symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices.

In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a structure in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.16 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination thereof. As used herein, 2 elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a processor that controls an allocation of a Physical Uplink Shared Channel (PUSCH) and an allocation of a Demodulation Reference Signal (DMRS) for the PUSCH; and
   a transmitter that transmits the PUSCH and the DMRS,
   wherein, when each of a plurality of the PUSCHs is respectively allocated to a plurality of contiguous short transmission time intervals (sTTIs) shorter than a subframe, the processor controls the allocation of the DMRS to an sTTI depending on whether or not the sTTI included in the plurality of sTTIs is at the top of the plurality of sTTIs, and
   wherein, when the sTTI is at the top of the plurality of sTTIs, the processor controls not to allocate the DMRS to any symbol in the sTTI.

2. The terminal according to claim 1, wherein a same number of Physical Resource Blocks (PRBs), and a same transmission power of the PUSCHs are allocated to the plurality of sTTIs, respectively.

3. A radio communication method for a terminal, comprising:
   controlling an allocation of a Physical Uplink Shared Channel (PUSCH) and an allocation of a Demodulation Reference Signal (DMRS) for the PUSCH; and
   transmitting the PUSCH and the DMRS,
   wherein, when each of a plurality of the PUSCHs is respectively allocated to a plurality of contiguous short transmission time intervals (sTTIs) shorter than a subframe, controlling the allocation of the DMRS to an sTTI depending on whether or not the sTTI included in the plurality of sTTIs is at the top of the plurality of sTTIs, and
   wherein, when the sTTI is at the top of the plurality of sTTIs, the terminal controls not to allocate the DMRS to any symbol in the sTTI.

4. A base station comprising:
   a processor that, when each of a plurality of Physical Uplink Shared Channels (PUSCHs) is respectively allocated to a plurality of contiguous short transmission time intervals (sTTIs) shorter than a subframe, determines that a Demodulation Reference Signal (DMRS) allocation to an sTTI is controlled, by a terminal, depending on whether or not the sTTI included in the plurality of sTTIs is at the top of the plurality of sTTIs; and a receiver that receives the PUSCH and the DMRS, and wherein, when the sTTI is at the top of the plurality of sTTIs, the processor determines that the DMRS is not allocated to any symbol in the sTTI.

5. A system comprising a terminal and a base station, wherein:

the terminal comprises:

a first processor that controls an allocation of a Physical Uplink Shared Channel (PUSCH) and an allocation of a Demodulation Reference Signal (DMRS) for the PUSCH; and a transmitter that transmits the PUSCH and the DMRS, wherein, when each of a plurality of the PUSCHs is respectively allocated to a plurality of contiguous short transmission time intervals (sTTIs) shorter than a subframe, the first processor controls the allocation of the DMRS to an sTTI depending on whether or not the sTTI included in the plurality of sTTIs is at the top of the plurality of sTTIs, and wherein, when the sTTI is at the top of the plurality of sTTIs, the first processor controls not to allocate the DMRS to any symbol in the sTTI; and the base station comprises:

a second processor that, when each of the plurality of the PUSCHs is respectively allocated to the plurality of contiguous sTTIs, determines that the DMRS allocation to the sTTI is controlled, by the terminal, depending on whether or not the sTTI included in the plurality of sTTIs is at the top of the plurality of sTTIs; and a receiver that receives the PUSCH and the DMRS.

* * * * *